United States Patent
Bhat et al.

(10) Patent No.: US 12,363,120 B2
(45) Date of Patent: Jul. 15, 2025

(54) ROLE-BASED ACCESS CONTROL USING CLOUD-NATIVE OBJECTS IN MULTI-TENANT ENVIRONMENTS

(71) Applicant: Kasten, Inc., Columbus, OH (US)

(72) Inventors: Onkar Bhat, San Jose, CA (US); Deepika Dixit, Santa Clara, CA (US); Vaibhav Kamra, Sunnyvale, CA (US); Thomas Manville, Mountain View, CA (US)

(73) Assignee: Kasten, Inc., Columbus, OH (US)

( * ) Notice: Subject to any disclaimer, the term of this patent is extended or adjusted under 35 U.S.C. 154(b) by 208 days.

(21) Appl. No.: 17/497,623

(22) Filed: Oct. 8, 2021

(65) Prior Publication Data
US 2023/0110527 A1    Apr. 13, 2023

(51) Int. Cl.
*H04L 9/40*    (2022.01)

(52) U.S. Cl.
CPC .......... *H04L 63/102* (2013.01); *H04L 63/101* (2013.01); *H04L 63/104* (2013.01)

(58) Field of Classification Search
CPC .... H04L 63/102; H04L 63/101; H04L 63/104
See application file for complete search history.

(56) References Cited

U.S. PATENT DOCUMENTS

| | | | |
|---|---|---|---|
| 7,669,244 B2 * | 2/2010 | Smith ................... | H04L 63/101 726/28 |
| 11,080,410 B1 * | 8/2021 | Sandall ................. | G06F 21/53 |
| 11,509,730 B1 * | 11/2022 | Peebles ................. | H04L 63/10 |
| 2014/0075565 A1 * | 3/2014 | Srinivasan ............. | H04L 63/10 726/26 |

(Continued)

FOREIGN PATENT DOCUMENTS

| CN | 110990150 A | * | 4/2020 | ......... G06F 21/6218 |
|---|---|---|---|---|
| CN | 112422555 A | | 2/2021 | |

OTHER PUBLICATIONS

Y. Luo et al., "RestSep: Towards a Test-Oriented Privilege Partitioning Approach for RESTful APIs, " 2017 IEEE International Conference on Web Services (ICWS), Honolulu, HI, USA, 2017, pp. 548-555, doi: 10.1109/ICWS.2017.64. (Year: 2017).*

Written Opinion of the International Searching Authority directed to related International Patent Application No. PCT/US2021/054189, Date of Mailing Jun. 7, 2022, WIPO Patent Scope Database-WO2023059339, 7 pages. (Year: 2022).*

(Continued)

*Primary Examiner* — Jung W Kim
*Assistant Examiner* — Sameera Wickramasuriya
(74) *Attorney, Agent, or Firm* — Sterne, Kessler, Goldstein & Fox P.L.L.C.

(57) ABSTRACT

Disclosed herein are system, method, and computer program product embodiments for role-based access control in multi-tenancy environments using cloud-native objects. An embodiment operates by executing an application in a cluster. The embodiment creates roles corresponding to a user or group of users. The embodiment defines a set of permissions for the roles. The embodiment binds the roles to native objects in a cloud orchestrator based on the set of permissions for the roles. The embodiment receives a first request from a user to log in. The embodiment transmits a request to authenticate the user. The embodiment receives a list of a set of permissions for the user. The embodiment causes a display of system assets on a user interface of a client device based on the list of the set of permissions for the user.

20 Claims, 15 Drawing Sheets

(56) References Cited

U.S. PATENT DOCUMENTS

| | | | |
|---|---|---|---|
| 2015/0319177 A1* | 11/2015 | Lietz | G06F 21/604 |
| | | | 726/6 |
| 2017/0339156 A1* | 11/2017 | Gupta | H04L 63/0807 |
| 2020/0120098 A1* | 4/2020 | Berg | H04L 63/104 |
| 2021/0067537 A1* | 3/2021 | Khanna | G06F 21/31 |
| 2021/0311763 A1* | 10/2021 | Beard | G06F 8/65 |
| 2021/0314310 A1* | 10/2021 | Cao | G06F 9/44505 |
| 2021/0377044 A1* | 12/2021 | Leibmann | H04L 9/3247 |
| 2022/0038449 A1* | 2/2022 | Tripp | H04L 63/0815 |
| 2022/0053001 A1* | 2/2022 | Shipkovenski | H04L 63/0823 |
| 2022/0342965 A1* | 10/2022 | Watanabe | G06F 11/3438 |

OTHER PUBLICATIONS

Tamai, Tetsuo, Naoyasu Ubayashi, and Ryoichi Ichiyama. "An adaptive object model with dynamic role binding." Proceedings of the 27th international conference on Software engineering. 2005. (Year: 2005).*

* cited by examiner

Fig. 7A

Dashboard Service 212

Policies

POLICY
snapshot-e2etest-234-ns-20210401-224-
○ e2etest-234

POLICY
Runnow-snapandexport-e2etest-dfgfd-dsf
○ manager.io/appNamespace: e2etest-dfgfd

Location Profiles

LOCATION PROFILES
export-profile-dfgdfg
CLOUD PROVIDER
Cloud
REGION
Virginia
BUCKET NAME
Staging Migration

Dashboard Service 212

Policies

POLICY
snapshot-e2etest-234-ns-20210401-224-

○ e2etest-234

POLICY
Runnow-snapandexport-e2etest-dfgfd-dsf

○ manager.io/appNamespace: e2etest-dfgfd

Location Profiles

LOCATION PROFILES
export-profile-dfgdfg

CLOUD PROVIDER
Cloud

REGION
Virginia

BUCKET NAME
Staging Migration

Fig. 7C

ROLE-BASED ACCESS CONTROL USING CLOUD-NATIVE OBJECTS IN MULTI-TENANT ENVIRONMENTS

BACKGROUND

With the advent of cloud-native applications, new application management systems have been designed for automating computer application deployment, management, backup, and migration. These application management systems can utilize native services on cloud-native data processing systems. These cloud-native data processing systems provide the flexibility of cluster deployment architectures. With the growing usage of cloud-native data processing systems across enterprises, multi-tenancy environments are necessary to improve the usability of application management systems at the cluster level.

These multi-tenant environments require a secure, yet flexible integration approach for authenticating and authorizing users. Users in a multi-tenant environment may have various roles and permissions. However, legacy application management systems are unable to provide role-based access control (RBAC) to restrict system access to authorized users in multi-tenant environments using cloud-native objects.

BRIEF DESCRIPTION OF THE DRAWINGS

The accompanying drawings are incorporated herein and form a part of the specification.

FIG. 7A is an example illustrating a dashboard service display of policies and profiles for an admin user, according to some embodiments.

FIG. 7C is an example illustrating a dashboard service display of policies and profiles for a config user, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for role-based access control using cloud-native objects in multi-tenant environments. With the increasing adoption of cloud-native architectures and platforms, a significant portion of applications and data have moved to cloud orchestration systems. Cloud orchestration systems can automate deployment, scaling, and management of containerized applications. Cloud orchestration systems can also group containerized applications in a cluster to allow for efficient management of containerized applications.

With the growing usage of cloud orchestration systems across enterprises, there is a need to support multiple tenants using these cloud orchestrator systems. Therefore, a technological solution is needed to achieve role-based access control (RBAC) in multi-tenant environments. RBAC is a method of restricting network access based on the role of individual users or groups of users. RBAC within multi-tenant environments would be enhanced by using cloud-native objects that allow application management systems to define a set of permissions at the cluster level.

This technological solution would allow for a secure, yet flexible approach to RBAC in multi-tenant environments. This solution may provide an IT/Cloud Ops team a scalable and secure manner in which to support various business units, departments, and self-service with granular access control while still operating at DevOps speed. Implementation of RBAC using cloud-native objects may create a more seamless and streamlined user experience for the user by limiting the user interface to only those applications and resources to which a user has authorization to access.

Figure 1:
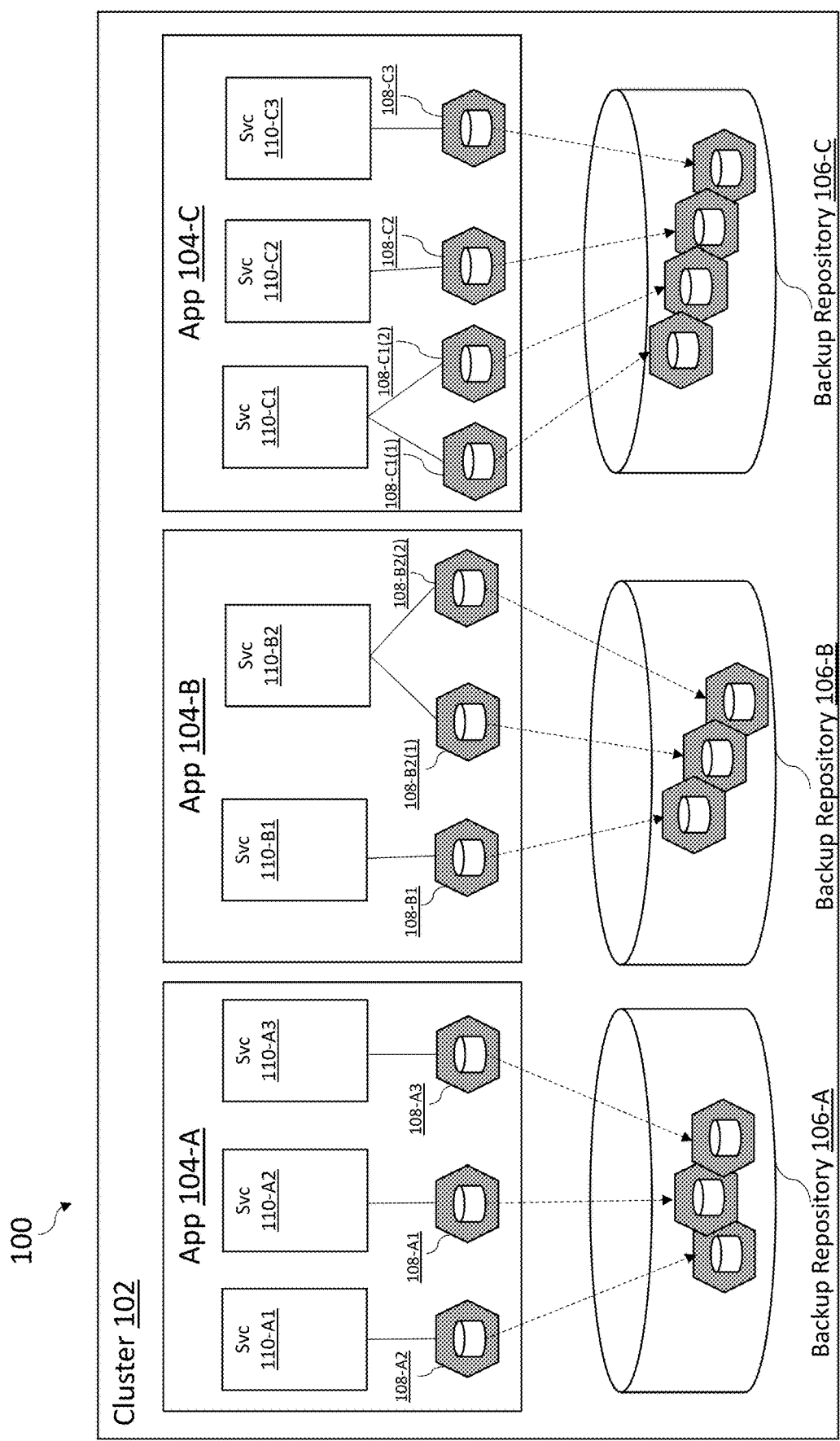
FIG. 1 is a block diagram illustrating a cloud orchestration system, according to some embodiments.

FIG. 1 is a block diagram illustrating a cloud orchestration system, according to some embodiments. System 100 is an example embodiment of a cloud orchestration system. The system 100 may contain one or more applications 104 (104-A, 104-B, 104-C, . . . , 104-X, . . . ). Each application 104 may be a distributed application comprising microservices 110 (110-A1, 110-A2, 110-A3, . . . , 110-X1 . . . ). Each microservice 110 may have persistent data volumes 108 (108-A1, 108-A2, 108-A3, . . . , 108-X1(1), 108X1(2), . . . ). The applications 104 may be cluster managed by a cloud orchestrator or a cloud orchestration system 100, such as, but not limited to, Kubernetes, Amazon Elastic Container Service, AWS Fargate, Azure Container Instances, Google Cloud Run, Red Hat Openshift Container Platform, Rancher, Docker Swarm, Apache Mesos, Nomad, Google Kubernetes Engine, Azure Kubernetes Service, and/or any cloud orchestrator known to a person of ordinary skill in the art. The cluster 102 may simultaneously host and run multiple applications 104. The set of applications 104 in a cluster 102 can be dynamic, in which the composition of each application 104 may change over time (e.g., due to upgrades) and the set of applications 104 themselves may also change over time.

In order to back up the underlying data in a cloud orchestrator, the system 100 can use a per-application backup repository 106 (106-A, 106-B, 106-C, . . . 106-X, . . . ). An entire application 104 can be used as the unit when backing up application data in a backup repository 106. The system 100 can store the data from all the application persistent data volumes 108 in a single backup repository 106, such as an object store bucket. Moreover, data in a backup repository 106 may all belong to the same application 104 and data from different applications 104 may be stored in separate repositories 106.

Figure 2:
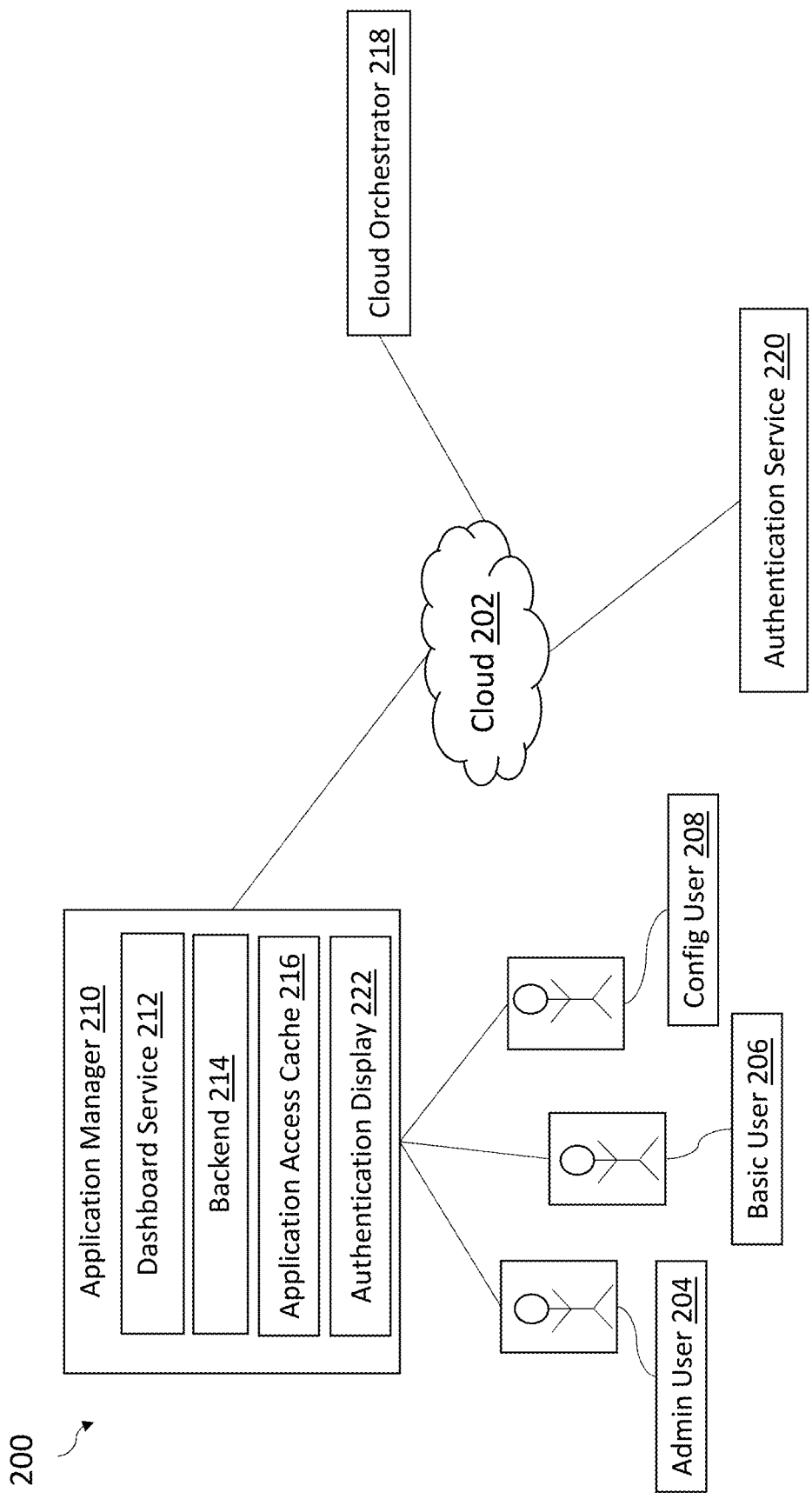
FIG. 2 is a block diagram illustrating a system architecture for role-based access control using cloud-native objects in multi-tenant environments, according to some embodiments.

FIG. 2 is a block diagram illustrating a system architecture for role-based access control using cloud-native objects in multi-tenant environments, according to some embodiments. FIG. 2 is described with reference to FIG. 1. System 200 may include a cloud 202, application manager 210, authentication service 220, and/or cloud orchestrator 218. Cloud 202 can be a network or combination of networks, including the internet, a local area network (LAN), a wide area network (WAN), a wireless network, a cellular network, or various other types of networks, as would be appreciated by a person of ordinary skill in the art. Application manager 210, cloud orchestrator 218, and/or authentication service 220, connected together through cloud 202, can operate on the networks of cloud 202 or be connected thereto.

Application manager 210 may manage applications 104 in cluster 102. Application manager 210 may include dashboard service 212, backend 214, application access cache 216, and/or authentication display 222. Authentication display 222 may include a graphical user interface through which the user may enter their log in credentials to gain access to dashboard service 212. Dashboard service 212 may be a graphical user interface through which the user interacts with application 104. Dashboard service 212 may include a front-end application or user interface component that displays various policies, profiles, applications, resources, and actions used to protect system assets for backup and migration. Dashboard service 212 may be a client program, desktop application, native application, mobile application, or other interactive display. In an embodiment, dashboard service 212 may include a program that is executing on one or more servers and is receiving and processing requests, including data updates, from more than one dashboard service 212 across a plurality of user devices.

Application manager 210 may be configured to process requests for backend 214. Application manager 210 may receive captured run-time information of a user's operations with the dashboard service 212. Backend 214 may be designated to handle operations performed by the user and determine whether the user is authorized to perform those operations. Backend 214 may be designated to determine the data that may be displayed on dashboard service 212 based on the permission level of a user. Backend 214 may operate across a plurality of machines or servers and manage received data across a plurality of machines or servers and manage a user's operations for multiple or different applications 104.

Various users may interact with dashboard service 212. The system 200 may use role-based access control to restrict network access based on the roles of users accessing applications 104. These users interacting with dashboard service 212 may include an admin user 204, basic user 206, and/or config user 208, according to some embodiments. In some embodiments, the configuration of roles based on the type of user and corresponding permissions for each user may vary for each of the applications 104.

Admin user 204 may be able to perform several operations. A namespace object may represent each of the applications 104. Admin user 204 may create policies to protect any namespace in a cluster 102. Admin user 204 may also be able to create location profiles that represent a backup target such as persistent data volumes 108. Admin user 204 may also be able to list actions created by all types of users in any namespace in cluster 102.

Basic user 206 may be able to perform more limited operations from the admin user 204, according to some embodiments. Basic user 206 may be able to list only the namespaces to which the basic user 206 has access. Basic user 206 may be able to manually backup and restore namespaces. In some embodiments, basic user 206 may be able to accomplish this without creating policies for the namespace. In some embodiments, basic user 206 may not have access or permission to other namespaces in cluster 102. Consequently, there may be a need to view policies and profiles in a different namespace in cluster 102 without having the permission to create or change existing policies in a different namespace.

Accordingly, config user 208 may be able to list policies and profiles in any namespace in cluster 102. In some embodiments, config user 208 may not be able to create or change existing policies or profiles in any namespace in cluster 102. This may allow basic user 206 the flexibility to view other policies or profiles as needed without cluttering the namespace for basic user 206 with unneeded policies or profiles. This may allow for a more seamless user experience for all users by adapting the dashboard service user interface based on the role of the user.

The front-end application of the dashboard service 212 may include an application access cache 216. Each user may have a corresponding token. Application access cache 216 may be a cache that tracks the applications 104 to which a user has access. Calculating the permissions for a user can be a time consuming operation for some legacy systems. Accordingly, application access cache 216 may reduce the latency of responses when dashboard service 212 requests for access related information corresponding to a user's token. Dashboard service 212 may query for certain objects on a periodic basis. These objects may include the applications 104 to which a user has access.

When dashboard service 212 provides a first request related to a user's access, application access cache 216 may have no entry related to a user's token. Accordingly, an asynchronous calculation may be triggered in backend 214. Application access cache 216 may return an empty response to dashboard service 212 for the first request. Once backend 214 completes the asynchronous calculation, backend 214 may add a key and value to application access cache 216. The key may be the user's token and the value may be the application list to which the user has access. The application access cache 216 may then retrieve the calculation from backend 214 and map the key and value to an application list with the applications 104 to which the user has access. Application access cache 216 may service subsequent requests from dashboard service 212. If there are any changes in cluster 102, such as the creation or deletion of applications 104, application access cache 216 may recalculate the entries for all the tokens in application access cache 216. If information about the user, such as the groups to which a user belongs to changes, backend 214 may calculate a new asynchronous calculation for the user's token. If entries in the application access cache 216 are not accessed for a certain period of time, then application access cache 216 may automatically delete the entries in application access cache 216.

Cloud orchestrator 218 may be a system for automating deployment, scaling, and management of containerized applications. Cloud orchestrator 218 groups containerized applications in a cluster to allow for more efficient management of containerized applications. Cloud orchestrator 218 may include the components of system 100. Cloud orchestrator 218 may be a system for managing cluster 102 that includes applications 104, microservices 110, persistent data volumes 108, and/or backup repositories 106. Cloud orchestrator 218 may include an API command to determine whether a current user can perform a given action. The API command may be applicable regardless of the authorization mode used. Accordingly, as part of this API command, cloud orchestrator 218 may use cloud-native objects including a cluster role binding cloud-native object and role binding cloud-native object to determine whether a user can perform a given action in a particular namespace within a cluster 102. This may increase the usability of dashboard service 212 by using these cloud-native objects to bind various roles and corresponding permissions in a multi-tenant environment. Cloud orchestrator 218 may use any command known to a person of ordinary skill in the art used to determine whether a user is authorized to perform an action in certain applications 104.

Application manager 210 may provide login credentials to an authentication service 220 to authenticate a user's credentials. Authentication service 220 may use authentication techniques known to a person of ordinary skill in the art to authenticate the user's login credentials.

Figure 3:
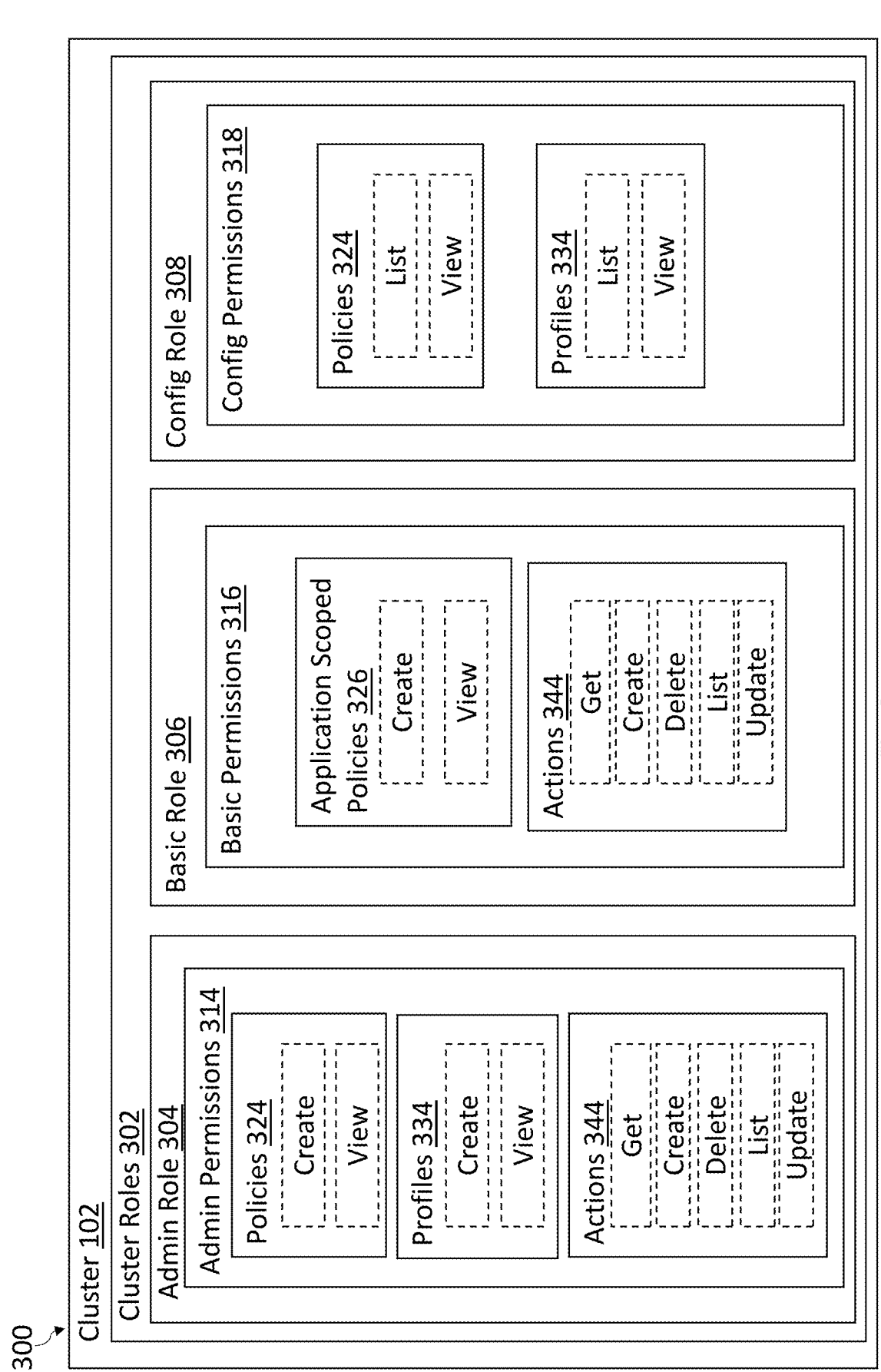
FIG. 3 is a block diagram illustrating a system for creating roles in a cluster, according to some embodiments.

FIG. 3 is a block diagram illustrating a system 300 for creating roles in a cluster 102, according to some embodiments. FIG. 3 is described with reference to FIG. 1 and FIG. 2. RBAC is a mechanism for restricting system access to authorized users. In multi-tenant environments, there may be various roles with corresponding permissions for each role. Accordingly, application manager 210 may create various roles for each namespace in cluster 102. When application manager 210 is deployed to manage applications 104 in cluster 102, application manager 210 may create roles leveraging cloud-native objects, according to some embodiments.

Cluster 102 may include cluster roles 302. Cluster roles 302 may include, but are not limited to, admin role 304, basic role 306, and/or config role 308. Each of the cluster roles 302 may contain rules that represent a set of permissions 310 (not shown). When application manager 210 is deployed, admin role 304 may be created. Admin role 304 may include a set of admin permissions 314. Admin permissions 314 may allow an authorized admin user 204 to create any policies 324 in cluster 102. Admin role 304 may also include admin permissions 314 to allow an admin user 204 to view any policies 324 created in cluster 102. Admin permissions 314 may include authorization of an admin user 204 to create and view the location of profiles 334 for any user. Moreover, admin permissions 314 may include authorization to list actions 344 created by all types of users in cluster 102. Actions 344 may include operations a user can perform (e.g., create, view, list, patch, put, get, restore, backup, etc.)

Basic role 306 may include a set of basic permissions 316. Basic permissions 316 may include authorization of a basic user 206 to list only the namespace 415 to which the basic user 206 has access. Namespace 415 may be a wrapper object with attributes and data representing applications 104.

Basic permissions 316 may include authorization to create and view basic policies 326 to which basic user 206 has access to protect applications 104. Basic permissions 316 may include authorization to basic user 206 to backup and restore objects in applications 104 represented by namespace 415. In some embodiments, basic user 206 may backup and restore objects in applications 104 represented by namespace 415 without creating basic policies 326.

Config role 308 may include a set of config permissions 318. Config permissions 318 may include authorization of config user 208 to list and view all the policies 324 and profiles 334 in cluster 102 to which admin user 204 has access.

Figure 4:
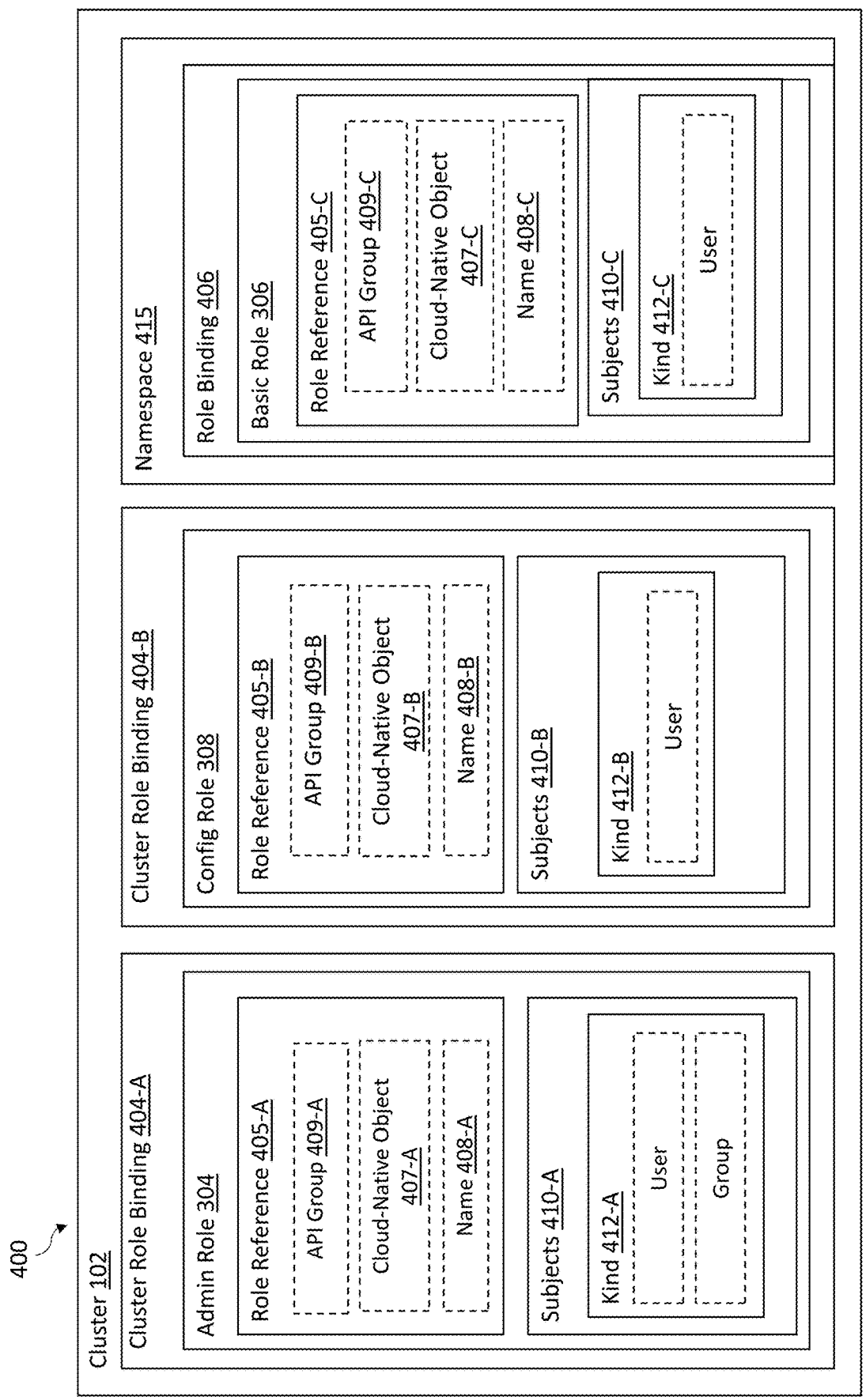
FIG. 4 is a block diagram illustrating a system for role-based access control by binding cloud-native objects in a cluster, according to some embodiments.

FIG. 4 is a block diagram illustrating a system for role-based access control by binding cloud-native objects in a cluster, according to some embodiments. FIG. 4 is described with reference to FIGS. 1-3. Cloud orchestrator 218 may include an API command to determine whether a current user can perform a given action. The API command may be applicable regardless of the authorization mode used. Accordingly, as part of this API command, cloud orchestrator 218 uses cloud-native objects including, but not limited to, a cluster role binding cloud-native object and role binding cloud-native object, to determine whether a user can perform a given action.

Accordingly, using the roles defined in FIG. 3, application manager 210 may bind admin role 304, basic role 306, and config role 308 using cloud-native objects. Cluster role binding 404 represents the cloud-native object that grants permissions to a user across an entire cluster. Admin role 304 may be bound by cluster role binding 404-A. In this case, cluster role binding 404-A allows an admin user 204 using application manager 210 to access, back up, and/or restore applications, resources, policies, profiles, and/or activities in cluster 102. Config role 308 may be bound by cluster role binding 404-B. Cluster role binding 404-B may allow a config user 208 using application manager 210 to access all policies and profiles in cluster 102.

On the other hand, application manager 210 may use a different cloud-native object to bind basic role 306. Application manager 210 may use a role binding 406 cloud-native object to bind basic role 306. Role binding 406 may grant basic permissions 316 defined for basic role 306 to a user or a set of users. Role binding 406 may grant permissions within a specific namespace, as opposed to cluster role binding 404, which may grant access to any policies 324, profiles 334, and/or actions 344 in cluster 102.

When application manager 210 binds cluster roles 302 using cluster role binding 404 or role binding 406, an object is created representing the cluster roles 302 based on the cluster role binding 404 or role binding 406 that is bound to the cluster roles 302. The object created from binding the cluster roles 302 to the cluster role binding 404 or role binding 406 object may include attributes such as a role reference 405 (e.g., 405-A, 405-B, 405-C, . . . , 405-X) and subjects 410 (e.g., 410-A, 410-B, 410-C, . . . , 410-X). The role reference 405 may include API Group 409 (e.g., 409-A, 409-B, 409-C, . . . , 409-X), cloud-native object 407 (e.g., cluster role binding 404 or role binding 406), and a name 408 (e.g., 408-A, 408-B, 408-C, . . . , 408-X).

Application manager 210 may also include certain subjects 410 that may be included in the cloud-native object bound to the cluster role binding 404. For example, admin role 304 may include individual users or users that belong to a group. Accordingly, each of the subjects 410 may include a subject kind 412, defining whether the user is an individual user with certain permissions 310 or a user belonging to a group with certain permissions 310. Both an admin user 204 with an admin role 304 and config user 208 with a config role 308 may access data in cluster 102 once their respective tokens have been bound to the cluster role binding 404.

Figure 5A:
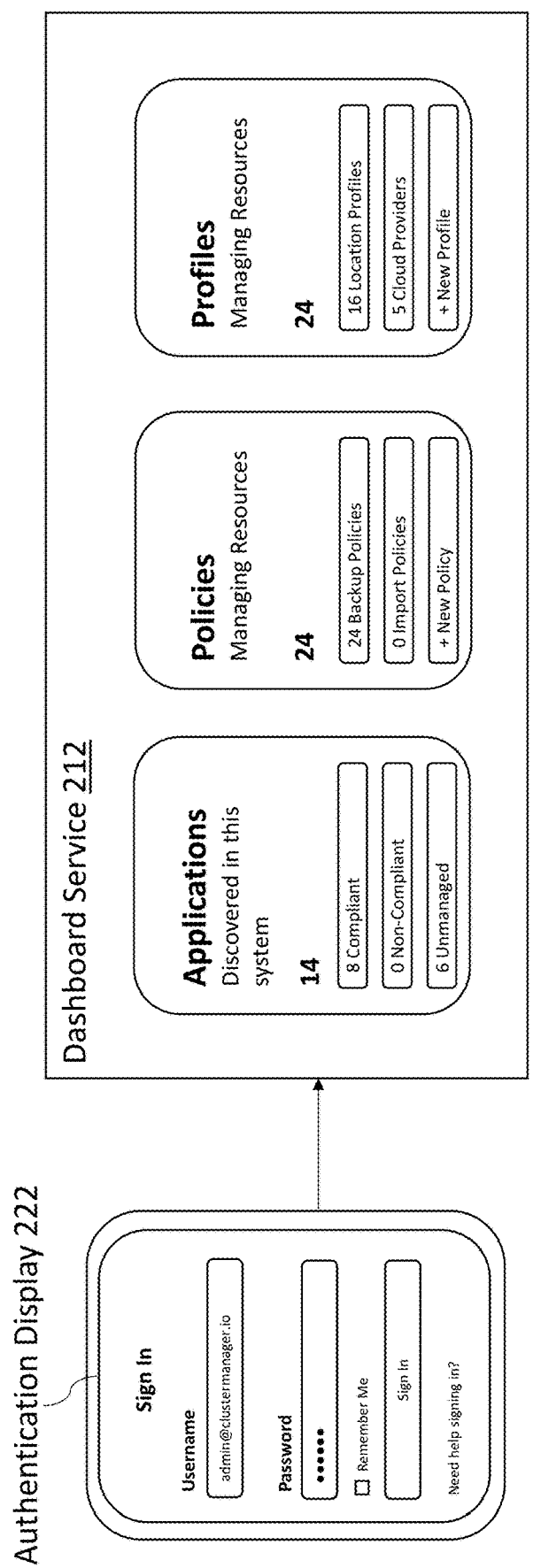
FIG. 5A is an example illustrating a dashboard service displaying system assets for an admin user, according to some embodiments.
Figure 5B:
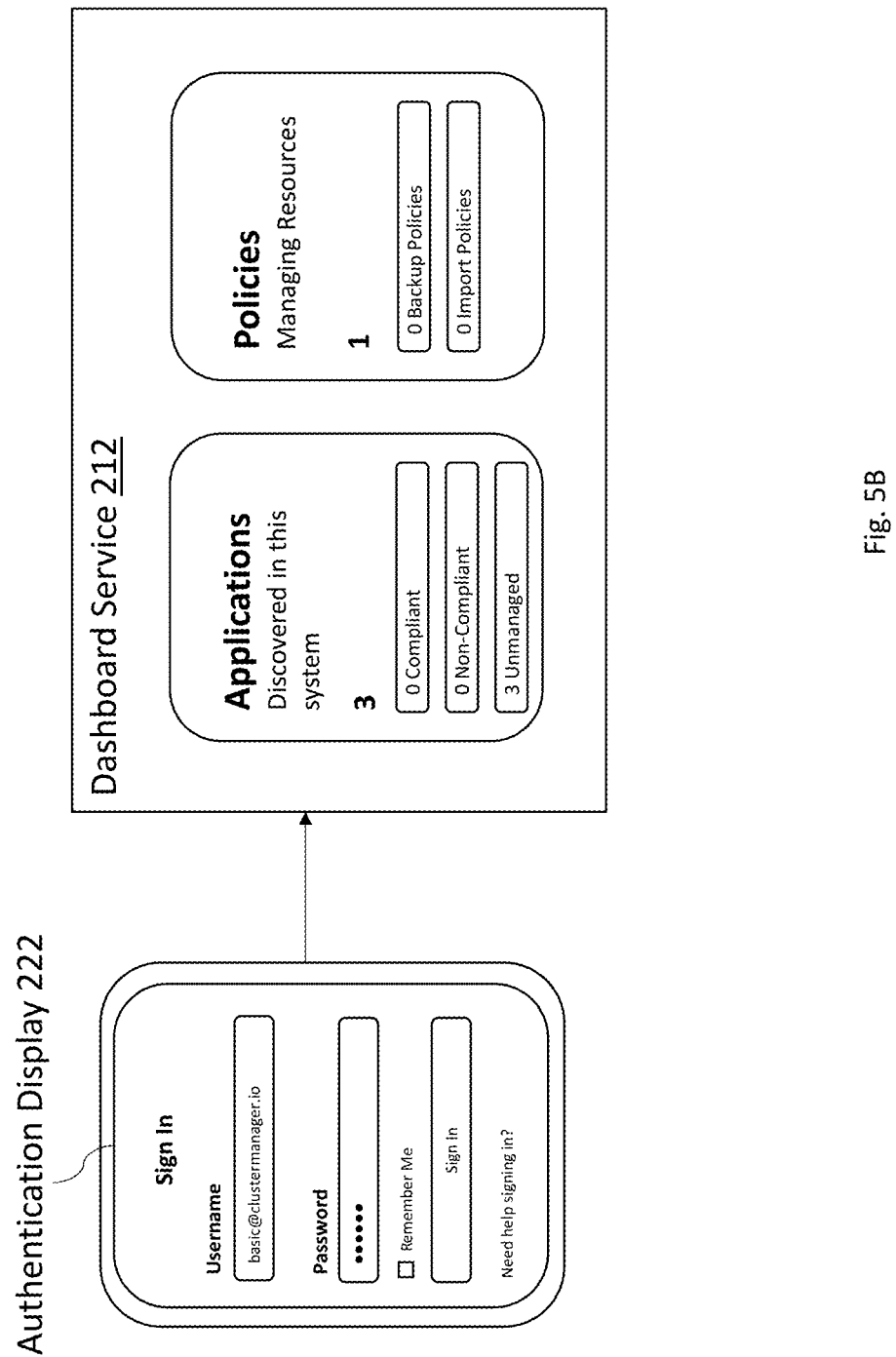
FIG. 5B is an example illustrating a dashboard service displaying system assets for a basic user, according to some embodiments.
Figure 5C:
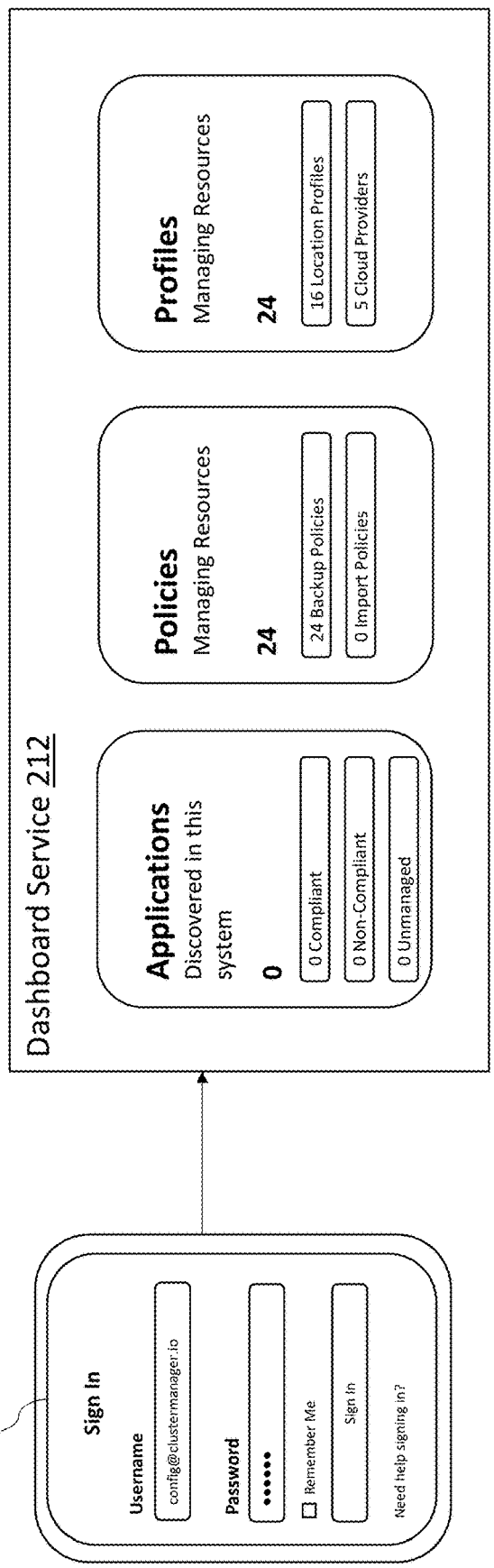
FIG. 5C is an example illustrating a dashboard service displaying system assets for a config user, according to some embodiments.

FIG. 5A-C are examples of the dashboard service display displaying system assets to which a user has access, according to some embodiments. FIG. 5 is described with reference to FIGS. 1-4. To illustrate the implementation of role-based access control in multi-tenant environments, an example is provided illustrating the authentication display 222 and dashboard service 212 display of the application manager 210 for an admin user 204. Here, an admin user 204 may log into application manager 210 using authentication display 222. The admin user 204 may enter their credentials into the authentication display 222. As shown in FIG. 5A, the admin user 204 has entered their username "admin@clustermanager.io" and their password.

Application manager 210 may retrieve the login credentials of the admin user 204 and send a request to authentication service 220 to authenticate the admin user 204 based on the retrieved login credentials of the admin user 204. For purposes of illustration, this is the first request the admin user 204 sent to application manager 210 for authentication. Accordingly, the application manager 210 may determine the admin user 204 is not authenticated. The application manager 210 may then send a request to authentication service 220 to authenticate the admin user 204 based on the retrieved login credentials of the admin user 204.

Authentication service 220 may authenticate the user. Authentication service 220 may send application manager 210 with an authorization code. Application manager 210 may send a request for a JSON Web Token (JWT) using the retrieved authorization code. Authentication service 220 may provide application manager 210 with a token for the admin user 204. Application manager 210 may send a request for authentication service 220 to verify the token. If authentication service 220 verifies the token, the admin user 204 may be redirected to dashboard service 212 of application manager 210.

Referring to FIGS. 5B and 5C, basic user 206 and config user 208 may enter their credentials in the same manner. Accordingly, the application manager 210 may retrieve the login credentials of the basic user 206 and config user 208 in the same manner as described for admin user 204.

As shown in FIG. 5A, the dashboard service 212 view for admin user 204 displays all the applications 104, policies 324, and profiles 334 in cluster 102. In this application 104 within cluster 102, there are fourteen applications 104, twenty-four policies 324, and twenty-four profiles 334. Admin user 204 has access to each of these applications 104, policies 324, and profiles 334. In contrast, as shown in FIG. 5B, the dashboard service 212 view for basic user 206 displays only the applications 104 and basic policies 326 in the namespace 415 to which basic user 206 has access. The basic user 206 is only able to see a fewer number of namespaces compared to the admin user 204, particularly, only three applications 104 and one of the basic policies 326. The basic user 206 can only view these three namespaces because the basic user 206 has Role Binding 406 for only these three namespaces.

Referring to FIG. 5C, config user 208 does not have access to any namespaces in cluster 102. However, config user 208 may view all the policies 324 in cluster 102. Config user 208 may not create, edit, or delete any policies 324. Moreover, while the user may view all the profiles 334 in cluster 102, config user 208 cannot create, edit, or delete profiles 334 in cluster 102. In some embodiments, the admin user 204 may provide config role 308 authorization to a basic user 206 in order to view policies 324 and profiles 334 in another namespace 415 the basic user 206 may not have access to without conferring authorization on the basic user 206 to create, edit, or delete policies and profiles 334.

Figure 6A:
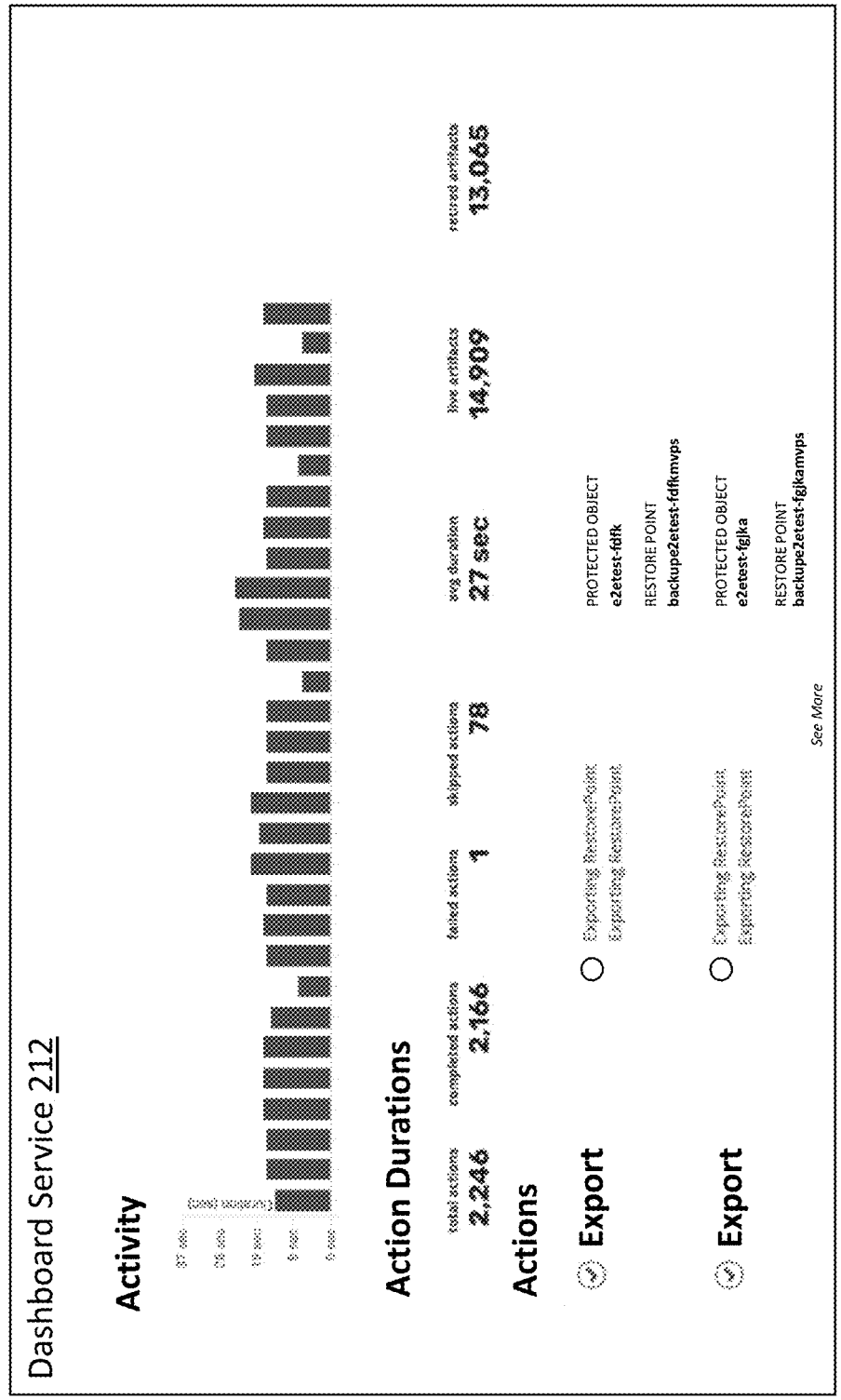
FIG. 6A is an example illustrating a dashboard service display of actions for an admin user, according to some embodiments.
Figure 6B:
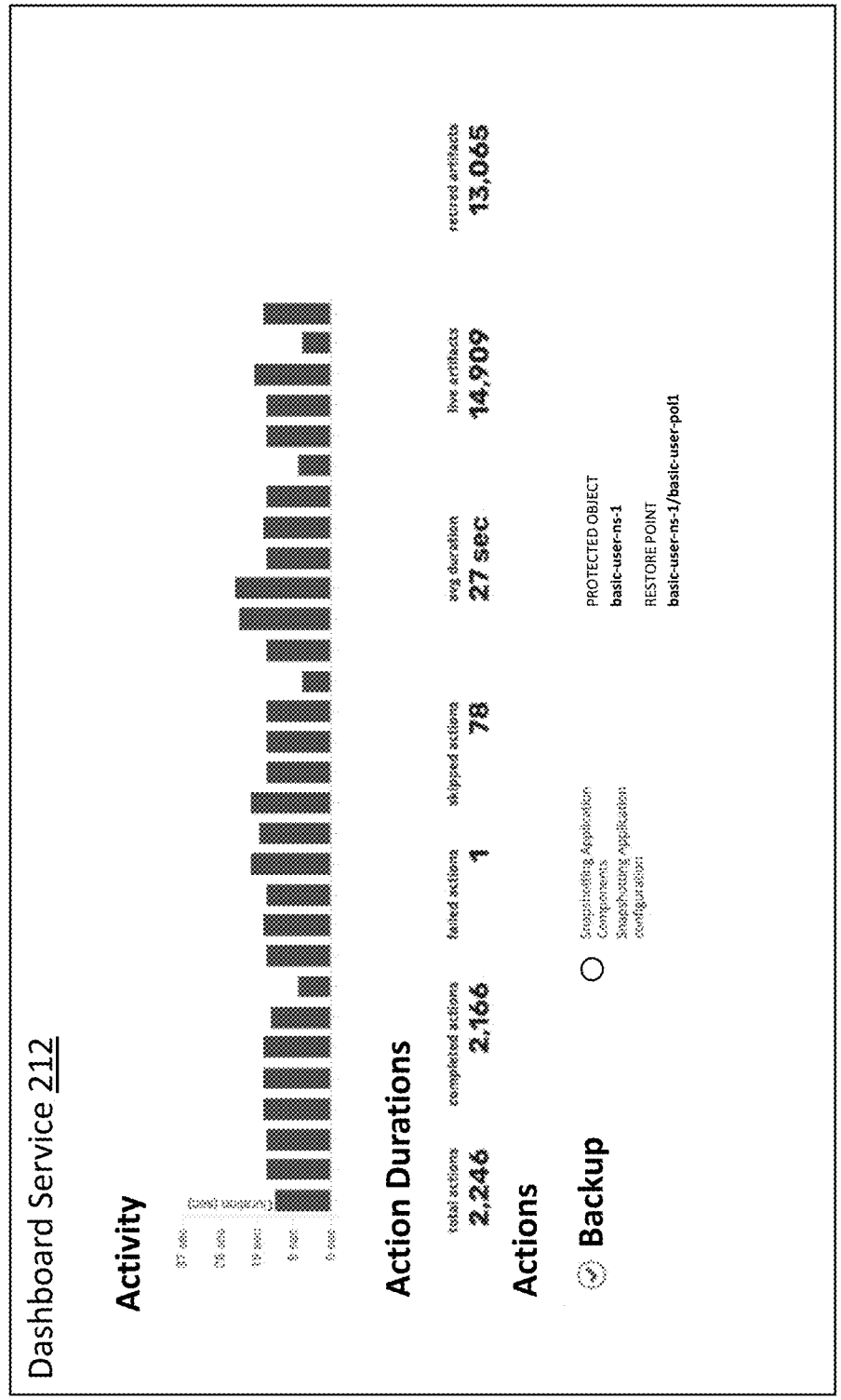
FIG. 6B is an example illustrating a dashboard service display of actions for a basic user, according to some embodiments.

FIGS. 6A and 6B are examples of the dashboard service 212 displaying the actions to which a user may have access, according to some embodiments. FIG. 6 is described with reference to FIGS. 1-5. An admin user 204 may view all the actions 344 in cluster 102. As shown in FIG. 6A, the dashboard service 212 displays all the actions 344 in cluster 102. Actions 344 are listed and the admin user 204 can view any action as indicated by the "see more" button. In contrast, FIG. 6B is the dashboard service 212 displaying only the actions to which the basic user 206 has access. As shown, the basic user 206 can only access the actions 344 in the namespace 415 for the "basic-user-ns-1" protected object. The dashboard service does not display any other actions 344 to which the admin user 204 may have access.

Moreover, because config user 208 does not perform any actions 344 except viewing profiles 324 and policies 334 in cluster 102, dashboard service 212 does not display any actions 344 for any user to the config user 208, according to some embodiments.

Figure 7B:
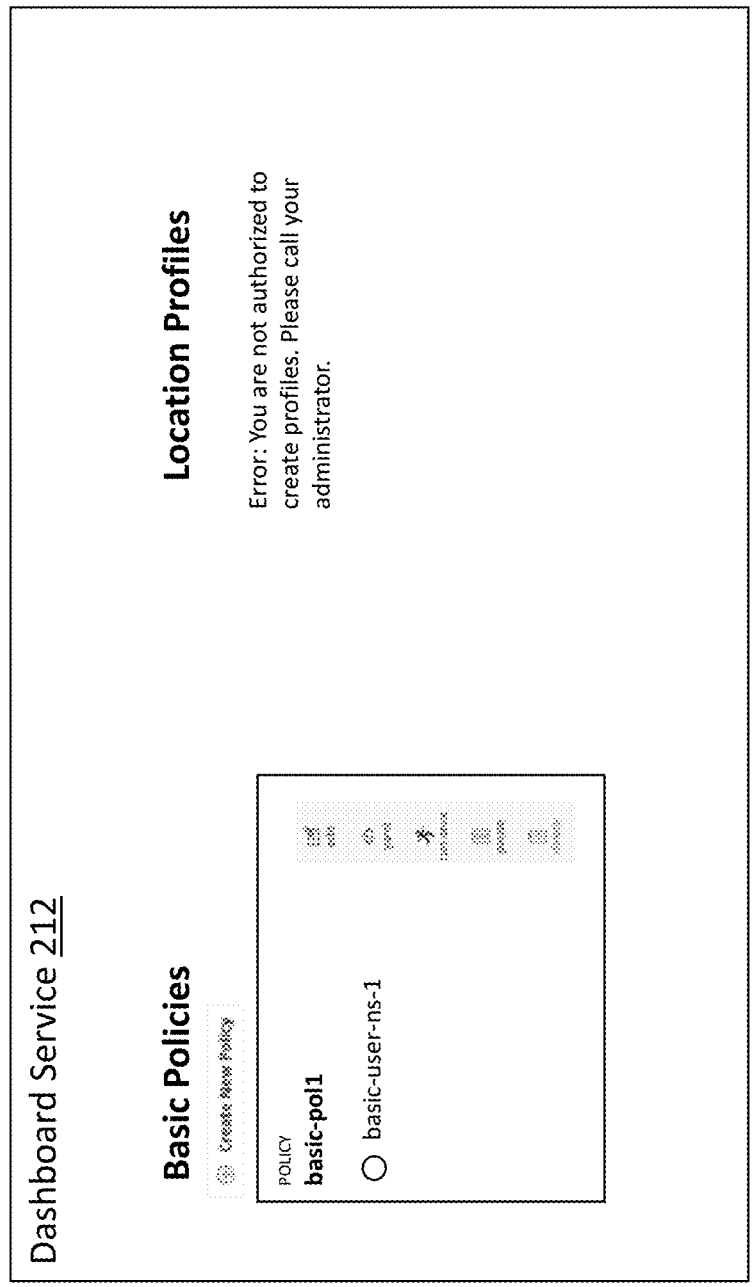
FIG. 7B is an example illustrating a dashboard service display of policies and profiles for a basic user, according to some embodiments.

FIGS. 7A-7C are examples of the dashboard service 212 displaying the policies and profiles to which a user may have access. As shown in FIG. 7A, admin user 204 has the option to view, edit, delete, and test any policies 324 in cluster 102. Admin user 204 can also view all policies 324 in cluster 102. In contrast, as shown in FIG. 7B, basic user 206 can only view, edit, modify, delete, and/or test the basic policies 326 within the namespace 415 for the protected objects to which the basic user 206 is bound. Therefore, only one policy is shown for the "basic-user-ns-1" protected objected created for basic user 206. The dashboard service 212 for basic user 206 also displays no location profiles 334 to which the admin user 204 has access. The dashboard service 212 displays an error message to basic user: "Error: You are not authorized to create profiles 334. Please call your administrator."

Finally, the dashboard service 212 for config user 208 may be similar to the dashboard service 212 of admin user 204. Config user 208 can view all policies 324 and location profiles 334 in cluster 102. However, unlike the dashboard service 212 for admin user 204, config user 208 may have no option to create, edit, modify, delete, or test any of these policies 324 and location profiles 334. Accordingly, the dashboard service 212 displayed in FIG. 7C does not display any buttons that allow config user 208 to create, edit, modify, and delete any of these policies 324.

Figure 8:
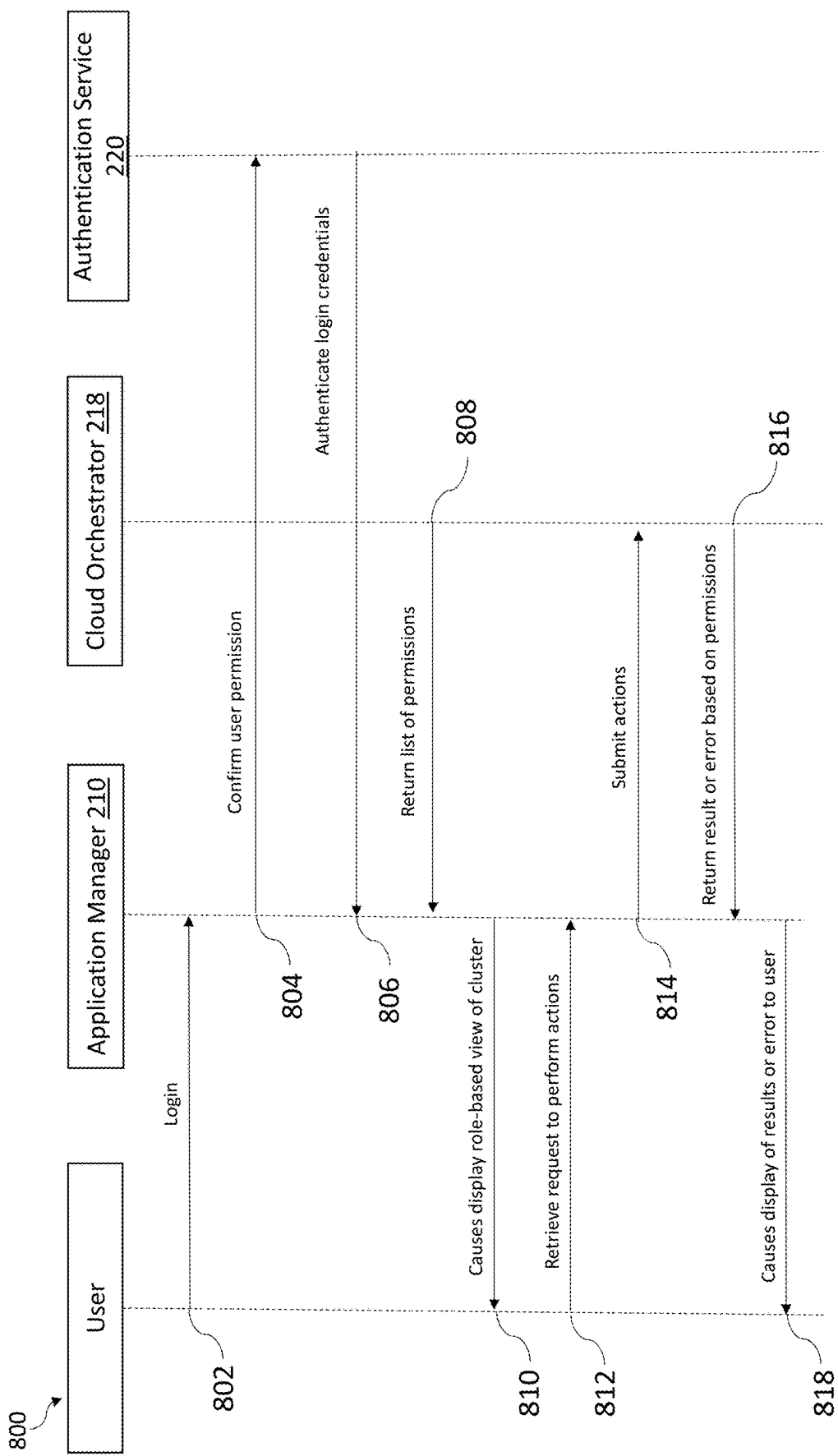
FIG. 8 is a flowchart illustrating a process for authorizing a user based on a cluster role binding in a multi-tenant environment, according to some embodiments.

FIG. 8 is a flowchart illustrating a process for a method for authorizing a user based on a cluster role binding in a multi-tenant environment, according to some embodiments. FIG. 8 is described with reference to FIGS. 1-7. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

At 802, application manager 210 receives a login request from a user dashboard service 212. A user may enter their credentials into the dashboard service 212. In some embodiments, application manager 210 may invoke the authorization endpoint of authentication service 220. The authorize endpoint may be used to request tokens or authorization codes through applications 104. Authentication service 220 may compare the callback URL of the application manager 210 with the callback URL registered with authentication service 220. If the callback URL registered with authentication service 220 and application manager 210 match, cloud orchestrator 218 may display a log in window on dashboard service 212.

At 804, application manager 210 sends a request to authentication service 220 to authenticate the user based on the retrieved login credentials of the user. In some embodiments, when a user sends a first request to the cloud orchestrator 218 for authentication, the application manager 210 may determine the user is not authenticated. The application manager 210 may then send a request to authentication service 220 to authenticate the user based on the retrieved login credentials of the user.

At 806, application manager 210 receives results from authentication service 220 relating to a user's authentication. Authentication service 220 may send application manager 210 with an authorization code. Application manager 210 may send a request for a JSON Web Token (JWT) using the retrieved authorization code. Authentication service 220 provide application manager 210 with a token for the user. Application manager 210 may send a request for authentication service 220 to verify the token. If authentication service 220 verifies the token, the user may be redirected to dashboard 212 of application manager 210.

At 808, application manager 210 sends a request to cloud orchestrator 218 to return a list of permissions. After the user is authenticated, cloud orchestrator 218 may determine a set of actions a user or group can perform in a namespace. For example, cloud orchestrator 218 may employ a command that evaluates the permissions granted to a user for applications 104 in a cluster 102. Cloud orchestrator 218 may return a list of permissions to application manager 210 using this command.

At 810, application manager 210 causes a display of a role-based view of cluster 102 on the dashboard service 212 of the client device. Depending on the list of permissions application manager 210 retrieved and the cluster role binding 404 attached to the user, application manager 210 causes a display of the applications, policies, profiles, and activities the user is authorized to access, view, modify, and/or edit on the dashboard service 212 of the client device.

At 812, application manager 210 retrieves a set of requests to perform certain actions from the user. Depending on the role the user is designated, the user may perform a certain set of actions. The user may request to perform a certain action on dashboard service 212. For example, a user may request to access, view, modify, list, and/or edit an application, policy, profile, and/or activity to which the user may or may not have access. Application manager 210 may submit these actions to cloud orchestrator 218 to determine whether the user is authorized to perform a certain set of actions.

At 814, application manager 210 submits these actions to cloud orchestrator 218 to confirm whether the user has permission to perform these operations based on the listed permissions for the designated cluster roles 302. Cloud orchestrator 218 may perform a command to determine whether the user is authorized to perform the action based on the user's designated cluster role 302 and cluster role binding.

At 816, application manager sends a request to cloud orchestrator 218 to return the results of an API command (e.g., determining whether a user is authorized to perform an operation) to application manager 210. If the user is authorized to perform the actions, the cloud orchestrator 218 may submit the results of the request to application manager 210. If the user is unauthorized to perform the actions, the cloud orchestrator 218 may submit an error to application manager 210 indicating the user is unauthorized to perform a certain action.

At 818, application manager 216 provides the results retrieved from cloud orchestrator 218 to the user. Application manager 216 authorizes the user to perform a certain set of actions if the cloud orchestrator determined the user is authorized to perform a certain set of actions. Application manager 216 causes a display of an error on the dashboard service 212 of the client device if the cloud orchestrator determined the user is unauthorized to perform a certain set of actions based on the list of permissions corresponding to the cluster role binding of the user.

Figure 9:
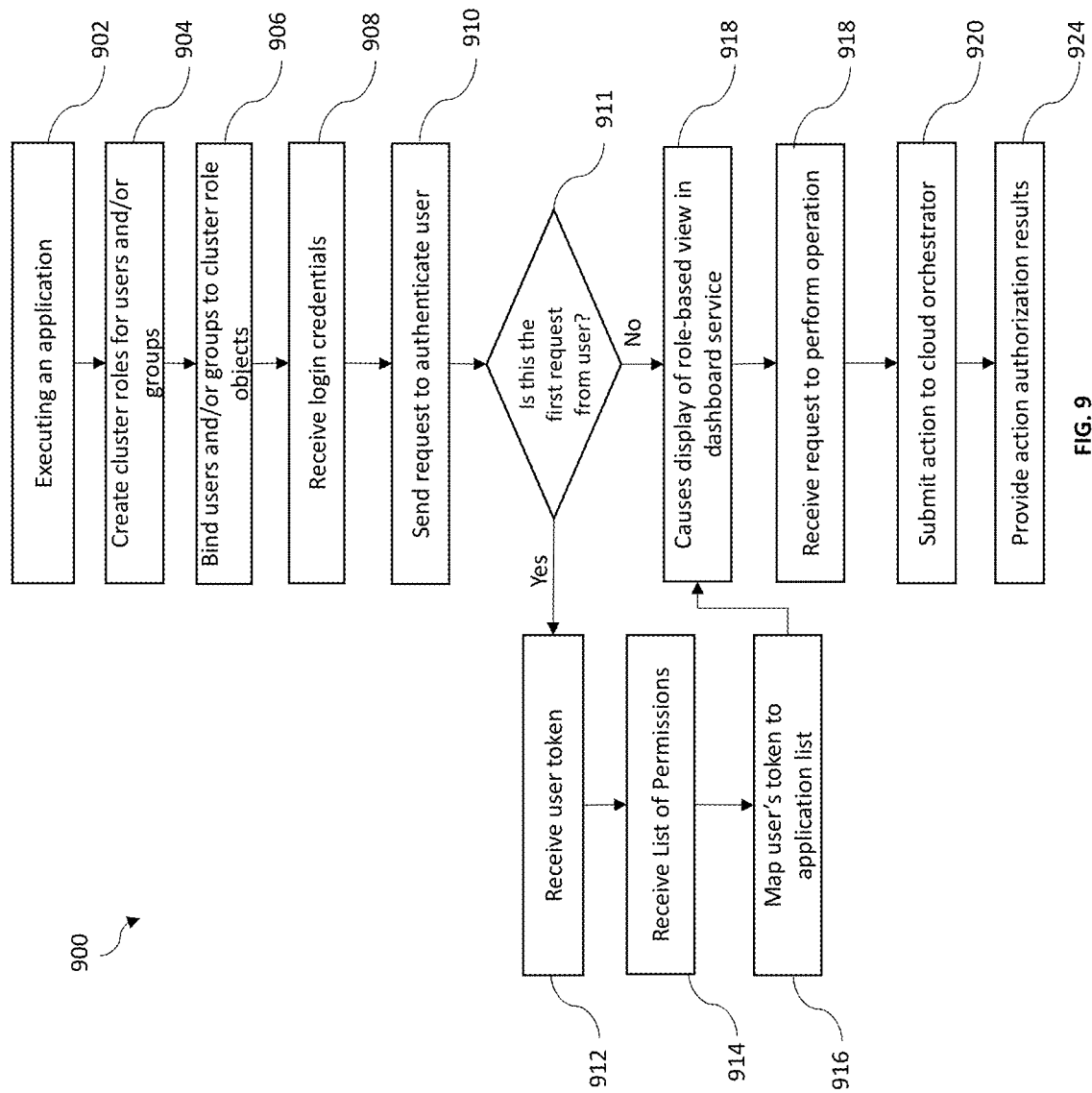
FIG. 9 is a flowchart illustrating a method for role-based access control using cloud-native objects in multi-tenant environment, according to some embodiments.

FIG. 9 is a flowchart illustrating a process for a method for role-based access control using cloud-native objects in multi-tenant environment, according to some embodiments. FIG. 9 is described with reference to FIGS. 1-8. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

At 902, application manager 210 executes an application. For example, application manager 210 may execute applications 104 in cluster 102.

At 904, application manager 210 creates roles for different users. When cluster manager 104 is implemented within a cluster 102, various roles may be created leveraging cloud-native objects, according to some embodiments. When application manager 210 is deployed, admin role 304 may be created. Admin role 304 may include a set of admin permissions 314. Admin permissions 314 may allow an authorized admin user 204 to create policies 324 in cluster 102. Admin role 304 may also include admin permissions 314 to allow an admin user 204 to view any policies 324 created in cluster 102. Admin permissions 314 may include authorization of an admin user 204 to create and view the location of profiles 334 for any user. Moreover, admin permissions 314 may include authorization to list actions 344 created by all types of users in cluster 102.

Application manager 210 may create a basic role 306. Basic role 306 may include a set of basic permissions 316. Basic permissions 316 may include authorization of a basic user 206 to list only the namespace 415 to which the basic user 206 has access. Basic permissions 316 may include authorization to create and view basic policies 326 in only the namespace 415 to which basic user 206 has access to protect applications 104. Basic permissions 316 may include authorization to basic user 206 to backup and restore objects in applications 104 represented by namespace 415. In some embodiments, basic user 206 may backup and restore objects in applications 104 represented by namespace 415 without creating basic policies 326.

Application manager 210 may create config role 308. Config role 308 may include a set of config permissions 318. Config permissions 318 may include authorization of config user 108 to list and view all the policies 324 and profiles 334 in cluster 102 to which admin user 204 has access.

At 906, application manager 210 binds user roles using cloud-native objects. For example, application manager 210 may bind admin role 304, basic role 306, and config role 308 using cloud-native objects. Cluster role binding 404 represents the cloud-native object that grants permissions to a user across an entire cluster. Admin role 304 and config role 308 may be bound by cluster role binding 404. In this case, cluster role binding 404 allows a user using application manager 210 to access applications, resources, policies, profiles, and/or activities in cluster 102.

On the other hand, application manager 210 may use a different cloud-native object to bind basic role 306. Application manager 210 may use a role binding 406 cloud-native object to bind basic role 306. Role binding 406 may grant basic permissions 316 defined for basic role 306 to a user or a set of users. Role binding 406 may grant permissions within a specific namespace 415, as opposed to cluster role binding 404, which may grant access to any policies 324, profiles 334, and/or actions 344 in cluster 102.

To refer to a cloud-native object cluster role binding, application manager 210 may query the role reference 404 which includes the API Group 406-A, the cluster role binding cloud-native object, and a name. Application manager 210 may also include certain subjects 410 that may be bound to the cluster role binding 404. Admin role 304 may include individual users or users that belong to a group. Accordingly, each of the subjects 410-A may include a subject kind 412-A, defining whether the user is an individual user with certain permissions 310 or a user belonging to a group with certain permissions 310. Both an admin user 204 and config user 208 with an admin role 304 and config role 308 may access data in any namespace 415 in cluster 102 once their respective tokens have been bound to the cluster role binding 404.

At 908, application manager 210 retrieves login credentials of the user from authentication display 222. In some embodiments, application manager 210 may invoke the authorization endpoint of authentication service 220. The authorize endpoint may be used to request tokens or authorization codes through an application. Authentication service 220 may compare the callback URL of the application manager 210 with the callback URL registered with authentication service 220. If the callback URL registered with authentication service 220 and application manager 210 match, cloud orchestrator 218 may display a log in window on dashboard service 212.

Application manager 210 may retrieve the login credentials of the user and send a request to authentication service 220 to authenticate the user based on the retrieved login credentials of the user. In some embodiments, when a user sends a first request to the cloud orchestrator 218 for authentication, the application manager 210 may determine the user is not authenticated. The application manager 210 may then send a request to authentication service 220 to authenticate the user based on the retrieved login credentials of the user.

At 910, application manager 210 sends a request to authenticate the user. Application manager 210 may transmit the login credentials received from the user to the authentication service 220 to determine whether the user is authorized to access dashboard service 212.

At 911, application manager 210 determines whether the request received is a first request from the user to access the application. Application manager 210 may retrieve the login credentials of the user and send a request to authentication service 220 to authenticate the user based on the retrieved login credentials of the user. In some embodiments, when a user sends a first request to the cloud orchestrator 218 for authentication, the application manager 210 may determine the user is not authenticated. The application manager 210 may then send a request to authentication service 220 to authenticate the user based on the retrieved login credentials of the user.

If the application manager 210 determines the request received is a first request from the user to access the application, method 900 may proceed to 912. If the application manager 210 determines the request received is not the first request from the user to access the application, method 900 may proceed to 918.

At 912, application manager 210 retrieves a token from the authentication service 220. Authentication service 220 may send application manager 210 with an authorization code. Application manager 210 may send a request for a JSON Web Token (JWT) using the retrieved authorization code. Authentication service 220 provide application manager 210 with a token for the user. Application manager 210 may send a request for authentication service 220 to verify the token. If authentication service 220 verifies the token, the user may be redirected to dashboard 212 of application manager 210.

At 914, application manager 210 receives a list of permissions from cloud orchestrator 218. After the user is authenticated, cloud orchestrator 218 may determine a set of actions a user or group can perform in a namespace. For example, a cloud orchestrator 218 may employ a command that evaluates the permissions granted to a user for applications 104 in a cluster 102. Cloud orchestrator 218 may return a list of permissions to application manager 210.

At 916, application manager 210 maps the user token with an application list. In some embodiments, once the application manager 210 retrieves the token associated with the user, the application access cache 216 may retrieve the calculation from the backend 214. Application access cache 216 may then be populated with a mapping of the user's token to an application list with the applications 104 to which the user has access. Application access cache 216 may service subsequent requests from dashboard service 212.

If there are any changes in the cluster 102, such as the creation or deletion of applications 104, the entries in the application access cache 216 may be recalculated for all the tokens in the application access cache 216. If information about the user, such as the groups to which a user belongs to changes, the backend 214 may calculate a new asynchronous calculation for the user's token. If entries in the application access cache 216 are not accessed for a certain period of time, then the application access cache 216 may be automatically deleted.

At 918, application manager 210 causes a display of a role-based view of cluster 102 in the dashboard service 212 of a client device. Depending on the list of permissions application manager 210 retrieved and the Cluster Role Binding 404 attached to the user, application manager 210 causes a display of the applications, policies, profiles 334, and activities the user is authorized to access, view, modify, and/or edit on the dashboard service 212 of the client device.

At 920, application manager 210 retrieves a set of requests to perform certain actions from the user. Depending on the role the user is designated, the user may perform a certain set of actions. The user may request to perform a certain action on dashboard service 212. For example, a user may request to access, view, modify, list, and/or edit an application, policy, profile, and/or activity to which the user may not have access. Application manager 210 may submit these actions to cloud orchestrator 218 to determine whether the user is authorized to perform a certain set of actions.

At 922, application manager 210 submits these actions to cloud orchestrator 218 to confirm whether the user has permission to perform these operations based on the listed permissions for the designated cluster role. Cloud orchestrator 218 may perform a command to determine whether the user is authorized to perform the action based on the user's designated role. If the user is authorized to perform the actions, the cloud orchestrator 218 may submit the results of the request to application manager 210. If the user is unauthorized to perform the actions, the cloud orchestrator 218 may submit an error to application manager 210 indicating the user is unauthorized to perform a certain action.

At 924, application manager 216 provides the results retrieved from cloud orchestrator 218 to the user. Application manager 216 may authorize user to perform a certain set of actions if the cloud orchestrator 218 determined the user is authorized to perform a certain set of actions. Application manager 216 causes a display of an error to the dashboard service 212 of the client device if the cloud orchestrator 218 determined the user is not authorized to perform a certain set of actions based on the list of permissions corresponding to the cluster role binding of the user.

Figure 10:
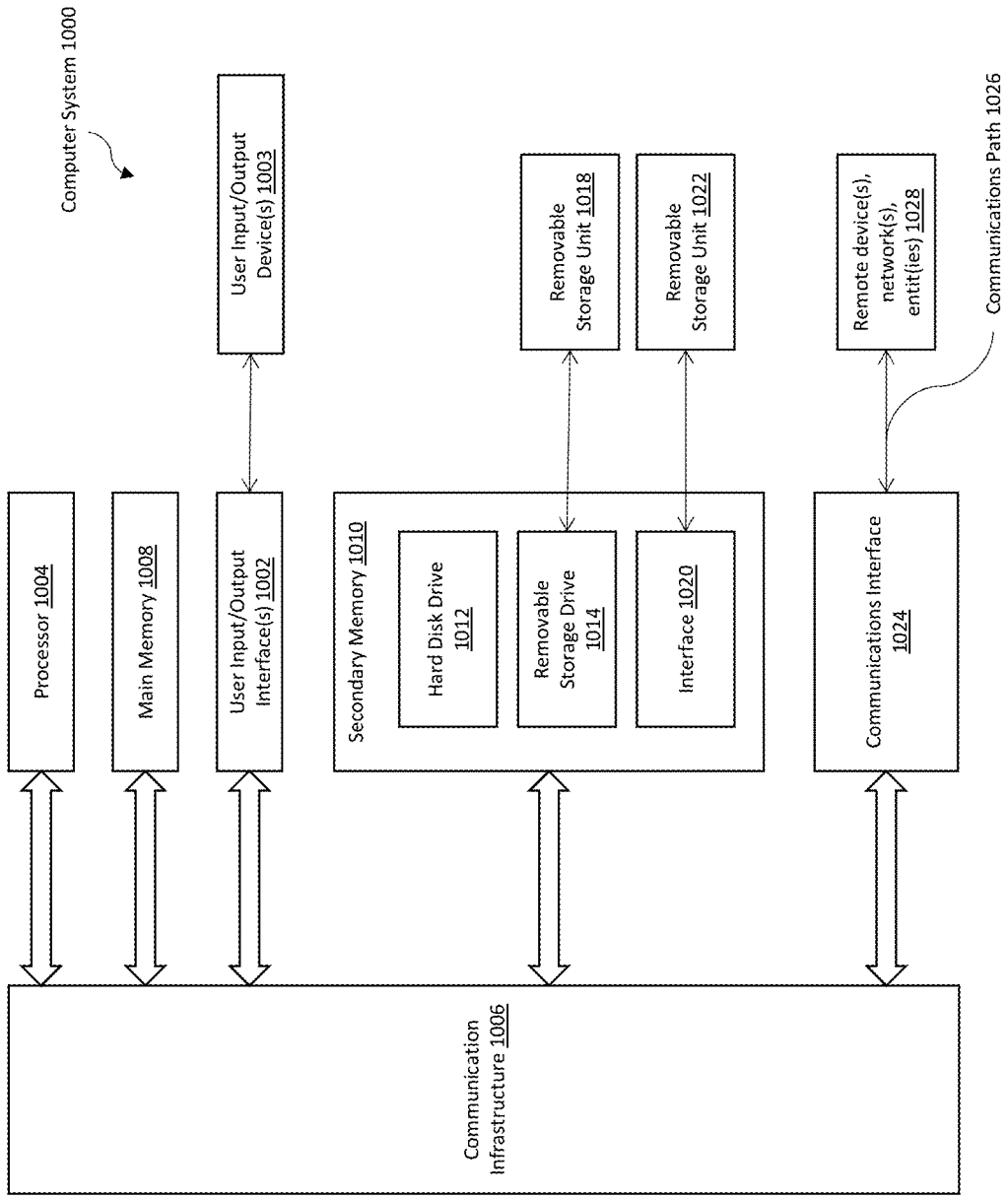
FIG. 10 is an example computer system useful for implementing various embodiments.

Various embodiments can be implemented, for example, using one or more computer systems, such as computer system 1000 shown in FIG. 10. FIG. 10 is described with reference to FIG. 1-9. Computer system 1000 can be used, for example, to implement method 800 of FIG. 8 and method 900 of FIG. 9. For example, computer system 1000 can implement and execute a set of instructions comprising creating roles corresponding to a user or group of users, defining a set of permissions for the roles, binding the roles to native objects in a cloud orchestrator, and/or displaying system assets on a user interface based on the list of the set of permissions for the user. Computer system 1000 can be any computer capable of performing the functions described herein.

Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 603, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for role-based access control in multi-tenant environments, comprising:
   executing an application in a cluster;
   creating a role object for the cluster, wherein the role object comprises a set of permissions for one or more namespaces in the cluster;
   creating a role binding object storing a mapping between a user and the set of permissions for the one or more namespaces in the cluster, wherein the role binding object is persistently stored and managed as a cloud-native object in a cloud-orchestrator, the role binding object specifies a binding of the user to the role object, and the role binding object designates that the user only has access to the one or more namespaces in the cluster;
   binding the role object to the role binding object to create an updated role object containing role references and subjects;
   receiving login credentials from the user;
   transmitting a request to an authentication service to authenticate the user based on the login credentials;
   receiving a list of permissions for the user corresponding to the set of permissions associated with the updated role object; and
   causing a display of one or more system assets on a user interface of a client device based on the list of permissions for the user.

2. The computer-implemented method of claim 1, further comprising:
   receiving a token corresponding to the user; and
   mapping the token corresponding to the user to an application access list, wherein the application access list comprises one or more applications to which the user has access.

3. The computer-implemented method of claim 2, further comprising:
   causing the display of the one or more system assets on the user interface of the client device based on the application access list.

4. The computer-implemented method of claim 1, further comprising:
   receiving, from the user, a request to perform a plurality of operations in the application;
   submitting, to the cloud orchestrator, a request to determine whether the user has authorization to perform the plurality of operations in the application based on the list of permissions for the user;
   receiving, from the cloud orchestrator, results that the user is authorized to perform the plurality of operations in the application; and
   authorizing the user to perform the plurality of operations in the application based on the results.

5. The computer-implemented method of claim 1, further comprising:
   receiving, from the user, a request to perform a plurality of operations in the application;
   submitting, to the cloud orchestrator, a request to determine whether the user has authorization to perform the plurality of operations in the application based on the list of permissions for the user;
   receiving, from the cloud orchestrator, results that the user is unauthorized to perform the plurality of operations in the application; and
   causing a display of an error message on the user interface of the client device based on the results.

6. The computer-implemented method of claim 1, further comprising:
   creating a second role object for the cluster, wherein the second role object comprises a second set of permissions for each namespace in the cluster; and
   creating a cluster role binding object based on a group of users and the second set of permissions, wherein the cluster role binding object specifies a binding of the group of users to the second role object, and the cluster role binding object designates that the group of users can perform one or more operations in each of the namespaces in the cluster.

7. The computer-implemented method of claim 1, further comprising:
   creating a second role object for the cluster, wherein the second role object comprises a second set of permissions for one or more namespaces in the cluster; and
   creating a second role binding object based on a group of users and the second set of permissions, wherein the second role binding object specifies a binding of the group of users to the second role object, and the second role binding object designates that the group of users only has access to the one or more namespaces in the cluster.

8. A system for role-based access control in multi-tenant environments, comprising:
a memory; and
at least one processor coupled to the memory and configured to:
execute an application in a cluster;
create a role object for the cluster, wherein the role object comprises a set of permissions for one or more namespaces in the cluster;
create a role binding object storing a mapping between a user and the set of permissions for the one or more namespaces in the cluster, wherein the role binding object is persistently stored and managed as a cloud-native object in a cloud-orchestrator, the role binding object specifies a binding of the user to the role object, and the role binding object designates that the user only has access to the one or more namespaces in the cluster;
bind the role object to the role binding object to create an updated role object containing role references and subjects;
receive login credentials from the user;
transmit a request to an authentication service to authenticate the user based on the login credentials;
receiving a list of permissions for the user corresponding to the set of permissions associated with the updated role object; and
cause a display of one or more system assets on a user interface of a client device based on the list of permissions for the user.

9. The system of claim 8, wherein the at least one processor is configured to:
receive a token corresponding to the user; and
map the token corresponding to the user to an application access list, wherein the application access list comprises one or more applications to which the user has access.

10. The system of claim 9, wherein the at least one processor is configured to:
cause the display of the one or more system assets on the user interface of the client device based on the application access list.

11. The system of claim 8, wherein the at least one processor is configured to:
receive, from the user, a request to perform a plurality of operations in the application;
submit, to the cloud orchestrator, a request to determine whether the user has authorization to perform the plurality of operations in the application based on the list of permissions for the user;
receive, from the cloud orchestrator, results that the user is authorized to perform the plurality of operations in the application; and
authorize the user to perform the plurality of operations in the application based on the results.

12. The system of claim 8, wherein the at least one processor is configured to:
receive, from the user, a request to perform a plurality of operations in the application;
submit, to the cloud orchestrator, a request to determine whether the user has authorization to perform the plurality of operations in the application based on the list of permissions for the user;
receive, from the cloud orchestrator, results that the user is unauthorized to perform the plurality of operations in the application; and
cause a display of an error message on the user interface of the client device based on the results.

13. The system of claim 8, wherein the at least one processor is configured to:
create a second role object for the cluster, wherein the second role object comprises a second set of permissions for each namespace in the cluster; and
create a cluster role binding object based on a group of users and the second set of permissions, wherein the cluster role binding object specifies a binding of the group of users to the second role object, and the cluster role binding object designates that the group of users can perform one or more operations in each of the namespaces in the cluster.

14. The system of claim 8, wherein the at least one processor is configured to:
create a second role object for the cluster, wherein the second role object comprises a second set of permissions for one or more namespaces in the cluster; and
create a second role binding object based on a group of users and the second set of permissions, wherein the second role binding object specifies a binding of the group of users to the second role object, and the second role binding object designates that the group of users only has access to the one or more namespaces in the cluster.

15. A non-transitory computer-readable medium for role-based access control in multi-tenant environments having instructions stored thereon that, when executed by at least one computing device, cause the at least one computing device to perform operations comprising:
executing an application in a cluster;
creating a role object for the cluster, wherein the role object comprises a set of permissions for one or more namespaces in the cluster;
creating a role binding object storing a mapping between a user and the set of permissions for the one or more namespaces in the cluster, wherein the role binding object is persistently stored and managed as a cloud-native object in a cloud-orchestrator, the role binding object specifies a binding of the user to the role object, and the role binding object designates that the user only has access to the one or more namespaces in the cluster;
binding the role object to the role binding object to create an updated role object containing role references and subjects;
receiving login credentials from the user;
transmitting a request to an authentication service to authenticate the user based on the login credentials;
receiving a list of permissions for the user corresponding to the set of permissions associated with the updated role object; and
causing a display of one or more system assets on a user interface of a client device based on the list of permissions for the user.

16. The non-transitory computer-readable medium of claim 15, the operations further comprising:
receiving a token corresponding to the user; and
mapping the token corresponding to the user to an application access list, wherein the application access list comprises one or more applications to which the user has access.

17. The non-transitory computer-readable medium of claim 16, the operations further comprising:

causing the display of the one or more system assets on the user interface of the client device based on the application access list.

18. The non-transitory computer-readable medium of claim 15, the operations further comprising:

receiving, from the user, a request to perform a plurality of operations in the application;

submitting, to the cloud orchestrator, a request to determine whether the user has authorization to perform the plurality of operations in the application based on the list of permissions for the user;

receiving, from the cloud orchestrator, results that the user is authorized to perform the plurality of operations in the application; and authorizing the user to perform the plurality of operations in the application based on the results.

19. The non-transitory computer-readable medium of claim 15, the operations further comprising:

creating a second role object for the cluster, wherein the second role object comprises a second set of permissions for each namespace in the cluster; and creating a cluster role binding object based on a group of users and the second set of permissions, wherein the cluster role binding object specifies a binding of the group of users to the second role object, and the cluster role binding object designates that the group of users can perform one or more operations in each the namespaces in the cluster.

20. The non-transitory computer-readable medium of claim 15, the operations further comprising:

creating a second role object for the cluster, wherein the second role object comprises a second set of permissions for one or more namespaces in the cluster; and creating a second role binding object based on a group of users and the second set of permissions, wherein the second role binding object specifies a binding of the group of users to the second role object, and the second role binding object designates that the group of users only has access to the one or more namespaces in the cluster.

* * * * *